United States Patent [19]
Suematsu

[11] Patent Number: 5,329,096
[45] Date of Patent: Jul. 12, 1994

[54] HEAT STORAGE MAT

[75] Inventor: Mitsulu Suematsu, Urawa, Japan

[73] Assignees: Toa Giken Co., Ltd., Saitama; Asset Enterprise Co., Ltd., Tokyo, both of Japan

[21] Appl. No.: 112,799

[22] Filed: Aug. 27, 1993

[30] Foreign Application Priority Data

Apr. 9, 1993 [JP] Japan ................... 5-017743[U]

[51] Int. Cl.$^5$ .............................................. F24H 7/00
[52] U.S. Cl. ................................ 219/528; 219/217; 5/421; 392/339
[58] Field of Search .................... 392/339, 340, 341; 219/212, 217, 528, 529; 5/421

[56] References Cited

U.S. PATENT DOCUMENTS

| | | | |
|---|---|---|---|
| 3,202,801 | 8/1965 | Saluri | 219/528 |
| 3,281,578 | 10/1966 | Chapman, Jr. | 219/528 |

FOREIGN PATENT DOCUMENTS

| | | | |
|---|---|---|---|
| 57-96978 | 6/1982 | Japan | 392/339 |
| 63-101657 | 5/1988 | Japan | 392/339 |
| 2195015 | 3/1988 | United Kingdom | 392/339 |
| 2228792 | 9/1990 | United Kingdom | 219/528 |

*Primary Examiner*—Geoffrey S. Evans
*Attorney, Agent, or Firm*—Nikaido, Marmelstein, Murray & Oram

[57] ABSTRACT

A heat storage mat for a bed is constructed to provide a heating intensity, a heat insulation and a cushioning effect which are adjusted to meet various conditions which are required for various parts of the driver's body to insure a comfortable sleep. The heat storage mat includes a plurality of heating elements arranged in a row in a longitudinal direction of the mat. Each of the heating elements is composed of a flat bag filled with a latent heat storage agent and an electric heater unit disposed on an underside of the flat bag. The quantities of the latent heat storage agents associated with the respective heating elements increase successively in a direction from a head side toward a leg side of the mat. A plurality of heat insulating cushions are disposed on upper surfaces of the corresponding bags. The heat insulating cushions have thicknesses which vary in inverse proportion to the quantities of the latent heat storage agents of the respective bags. The heating elements and the heat insulating cushions are enclosed in a bag-like cover.

7 Claims, 3 Drawing Sheets

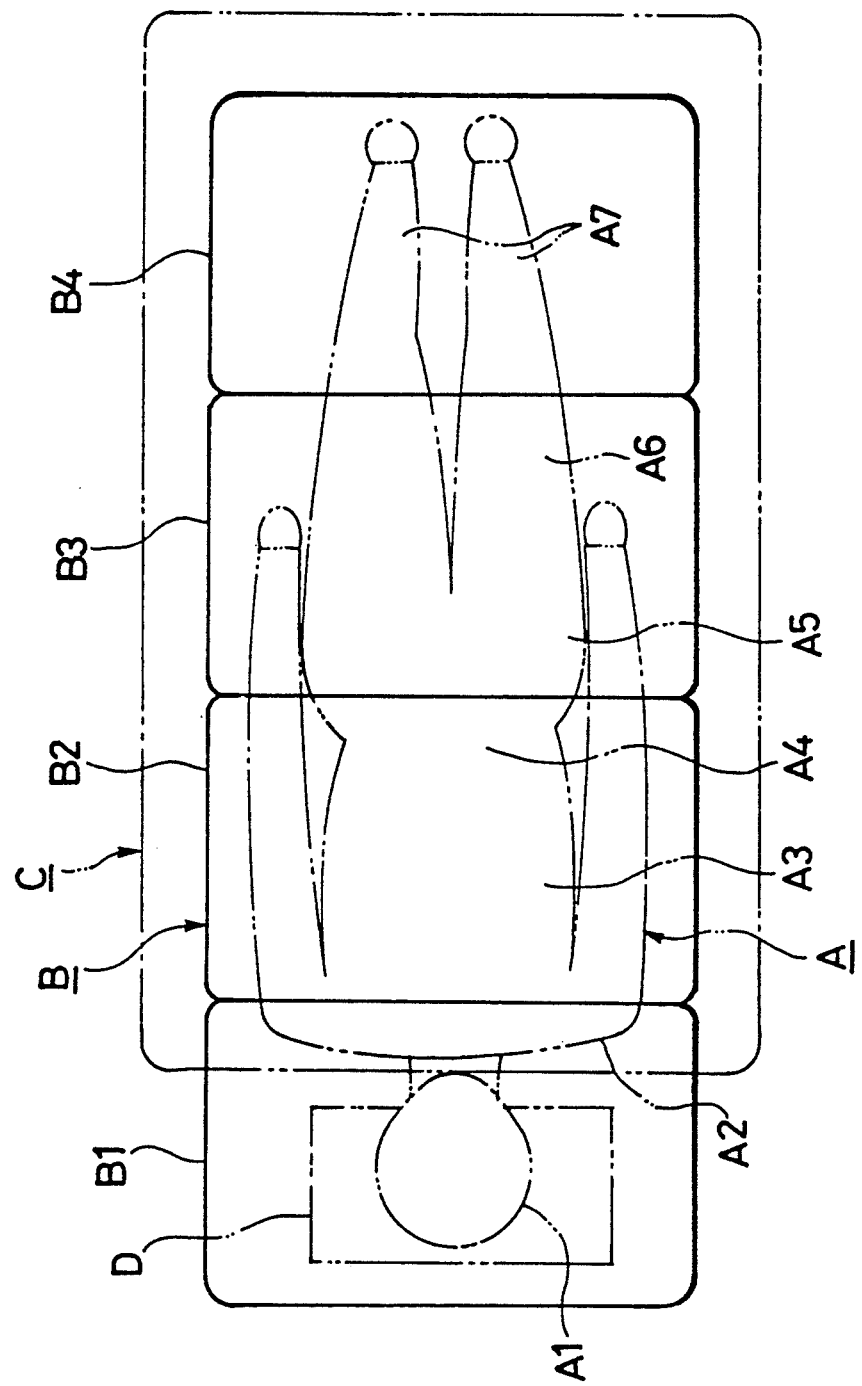

HEAT STORAGE MAT

BACKGROUND OF THE INVENTION

1. Field of the Invention

The present invention relates to a heat storage mat of the type using a substance which is capable of evolving heat at a constant temperature when the substance undergoes a phase change or transformation from the liquid state into the solid state. The heat storage mat is particularly useful when embodied in a napping or brief sleeping bed for long-distance trucks. When the truck is running, the heat storage mat is able to store heat by using electric power which is generated while a truck is running, and when the driver is taking a nap within the truck at a stop, the heat storage mat evolves heat so as to keep the inside of the napping bed at a comfortable temperature.

2. Description of the Prior Art

One known heat storage mat is disclosed in Japanese Utility Model Laid-open Publication 2-42266, which utilizes a latent heat storage substance or agent capable of evolving heat at a transformation temperature. Electric power which is generated while a truck is running is used in order to store or absorb heat within the heat storage agent. When the driver is taking a nap on the heat storage mat, the heat storage agent evolves heat to warm up the body of the driver in such a manner that the feet are kept at a higher temperature than the upper half of the body.

The known heat storage mat includes a heat insulating cushion wrapped in a bag-like cover and containing therein a series of heating elements. Each of the heating elements is composed of a bag filled with a heat storage agent and an electric heater unit that are disposed in a superposed relation within the heat-insulating cushion. When the mat is not used, the electric heater unit is energized to heat the heat storage agent which in turn absorbs heat as latent heat. When the electric heater unit is de-energized, the heat storage agent starts evolving heat to warm up the mat so that the mat is kept at a predetermined temperature for a predetermined period of time. The heat storage mat thus constructed is able to operate without the need for a battery used as a heat source, so that during the winter months or at a cold district, the truck driver can take a nap on the mat while the engine is stopped. Thus, over-discharging of the battery can be avoided.

In the heat storage mat described above, the heat storage agents received in the respective bags have different transformation temperatures so that the heating elements generate heat at different temperatures. The heating elements are arranged to create a temperature gradient so that the foot side of the truck driver is heated at a higher temperature than the head side. With this temperature gradient, the mat is able to provide a comfortable sleeping condition for the truck driver.

The known heat storage mat, however, is not fully satisfactory for the reasons discussed below in greater detail with reference to the accompanying drawings.

As shown in FIG. 3, the known heat storage mat B is composed of four parts B1–B4 arranged in a row in order to support thereon corresponding parts of the driver's body A. More specifically, the first part B1 is adapted to support a head A1 and shoulders A2 of the body A; the second part B2 is adapted to support a chest A3 and a waist A4 of the body A; the third part B3 is adapted to support a hip A5 and thighs A6 of the body A; and the fourth part B4 is adapted to support legs A7 of the body A. When the driver takes a nap on the heat storage mat B, most parts of the body A excluding the head A1 are covered with a coverlet such as a blanket C.

Various conditions which are required for the respective parts B1–B4 to keep the corresponding parts of the body A in a comfortable condition are as follows.

The head A1 which is placed on a pillow D requires a greater heat radiation rather than a heat retaining property. The shoulders A2 evolve a relatively small amount of heat but they are not so thermally weak to require an external heat source. In addition, a front side of the shoulders A2 is thermally insulated by the blanket C. The back of the shoulders A2 requires a high thermal insulation and an excellent cushioning effect.

The chest A3 and the waist A4 give off a great amount of heat so that when wrapped with the blanket C, these parts can be kept warm without using a heat source. However, to insure comfortable napping, the chest A3 and the waist A4 require an excellent cushioning effect.

The hip A5 and the thighs A6 evolve less amount of heat than the chest A3 and the waist A4 and hence these parts are unlikely to become warm. Thus, these parts require a heat source of a large thermal capacity. The back of the hip A5 and the thighs A6 is insensitive as compared with the back A3 and lower back A4. Accordingly, an excellent cushioning effect is not needed for the back of the hip A and the thighs A6.

The legs A7 evolve the least amount of heat and release a greater amount of heat. Accordingly, the legs A7 are likely to become cold soon. In order to warm up the legs A7, a greater heat source must be provided. In addition, since the legs A7 are likely to move frequently and widely, a heat retaining effect of the blanket C is substantially deteriorated. The cushioning property of the upper side of the fourth part B4 does not have a direct effect on a comfortable sleep.

The known heat storage mat failed to satisfy all of the requirements discussed above.

SUMMARY OF THE INVENTION

It is, therefore, an object of the present invention to provide a heat storage mat for beds which is composed of a series of mat portions each of which is able to provide a heating intensity, a heat insulating property, and a cushioning effect that are required for each corresponding part of the driver's body to insure a comfortable sleep.

An elongated heat storage mat of the present invention includes a plurality of substantially flat heating elements arranged in a row in the longitudinal direction of the mat. Each of the heating elements is composed of a flat bag filled with a latent heat storage agent, and an electric heater unit disposed on the underside of the flat bag for heating the latent heat storage agent held within the bag. The quantities of the latent heat storage agents associated with the respective heating elements increase successively in a direction from the head side toward the leg side of the mat. A plurality of heat insulating cushions are disposed on upper surfaces of the corresponding bags. The heat insulating cushions have thicknesses which vary in inverse proportion to the quantities of the latent heat storage agents of the respective bags. The heating elements and the heat insulating cushions are held within a bag-like cover.

Since the heating elements have different quantities of latent heat storage agents, and since the thicknesses of the cushions disposed on the corresponding heating elements vary inversely with the quantities of the latent heat storage agents. With this correlation between the cushion thickness and the latent heat storage agent quantity, the mat is able to provide a heating intensity, a heat insulation and a cushioning effect that are optimum for insuring a comfortable sleep.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3 is a diagrammatical plan view showing a conventional heat storage mat as it is used.

DETAILED DESCRIPTION OF THE INVENTION

Figure 1:
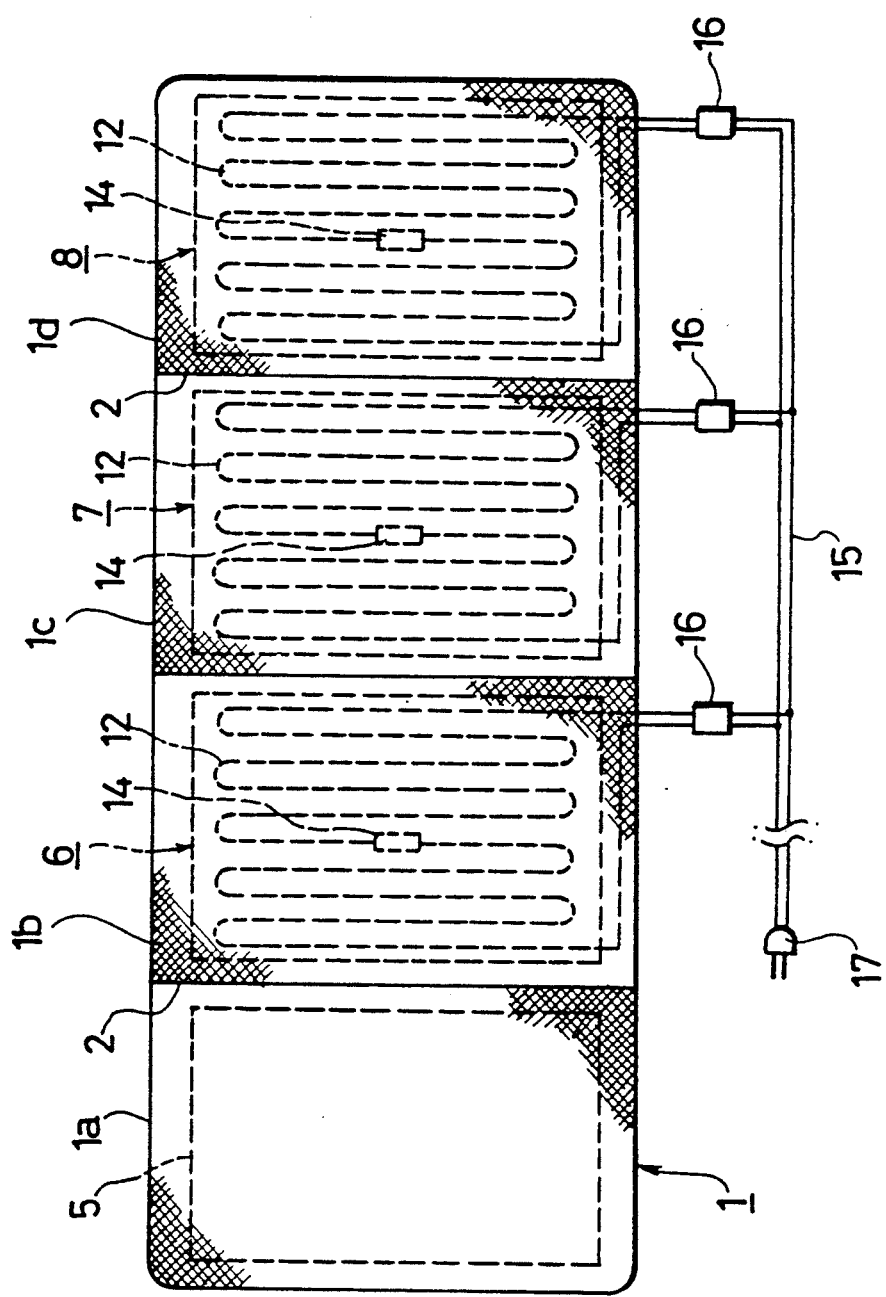
FIG. 1 is a plan view of a heat storage mat according to the present invention.
Figure 2:
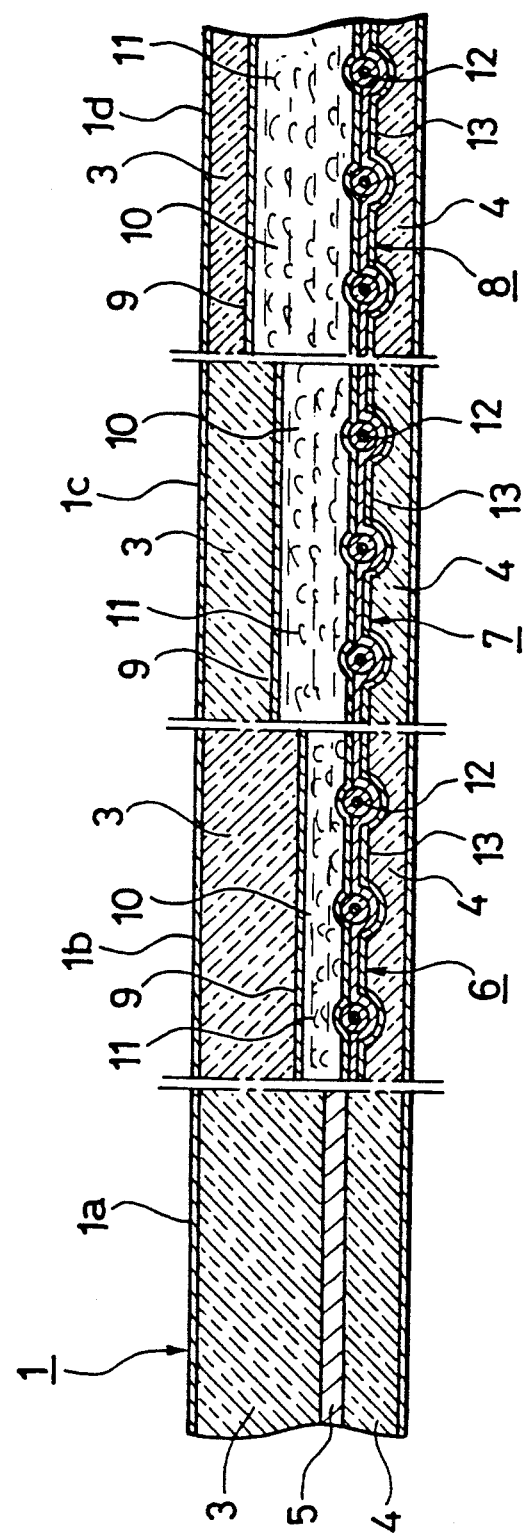
FIG. 2 is an enlarged longitudinal cross-sectional view of a main portion of the heat storage mat.

FIGS. 1 and 2 show a heat storage mat embodying the present invention. In the illustrated embodiment, the heat storage mat is used in a napping or brief sleeping bed for a long-distance truck, for example.

The heat storage mat includes a flat elongated bag-like cover 1 which is subdivided into a plurality (four in the illustrated embodiment) of flat rectangular bag-like cover pieces or members 1a, 1b, 1c and 1d along three transverse parting lines 2. The bag-like cover 1 is made of fabric. As shown in FIG. 2, each of the bag-like cover members 1a–1d holds therein an upper cushion 3 made of polyurethane foam and a lower cushion 4 made of polyurethane chips. The upper polyurethane foam cushion 3 is soft and elastic and has a high heat retaining ability. The lower polyurethane chip cushion 4 is relatively rigid and has a high heat retaining ability.

When the mat is used, the leftmost bag-like cover member (first cover member) 1a supports thereon the head of a driver while the rightmost bag-like cover member (fourth cover member) 1d supports thereon the legs of the driver. The first cover member 1a further includes a relatively rigid core plate 5 sandwiched between the upper cushion 3 and the lower cushion 4. In the first cover member 1a, the upper cushion 3 is thicker than the lower cushion 4. The upper cushion 3, the core plate 5 and the lower cushion 4 jointly form a cushion unit. The first cover member 1a is devoid of a heating element described below.

The second, third and fourth bag-like cover members 1b, 1c and 1d include first, second and third heating elements 6, 7 and 8, respectively. Each of the heating elements 6–8 is disposed between the upper and lower cushions 3, 4 of the corresponding bag-like cover members 1b, 1c, 1d.

The heating elements 6–8 each include a flat bag 9 made of a tough film of synthetic resin. The bag 9 is filled with a heat storage agent 10, such as sodium acetate, which is capable of absorbing and evolving a large amount of heat (latent heat), and an impregnated matrix 11 such as polyester felt. An electric heater unit comprises a cord heater 12 and is composed of a heating wire covered with a heat resistant insulator, such as silicone rubber. The cord heater 12 is attached to the underside of the bag 9 via an aluminum foil 10 which is bonded to the underside of the bag 9. The cord heater 12 extends zig-zag over the entire area of the underside of the bag 9, as shown in FIG. 2.

The heat storage agent 10 held within the bags 6–8 preferably has a transformation temperature of about 50° C. The transformation temperature of the heat storage agent 10 is common to the three heating elements 6–8. However, the quantities of the heat storage agents 10 used in the respective heating elements 6–8 vary such that the heat storage agent 10 associated with the second heating element 7 is greater in quantity than that in the first heating element 6 by about 50% to about 100%, and the heat storage agent 10 associated with the third heating element 8 is greater in quantity than that in the second heating element 7 by about 50% to about 100%.

The upper cushions 3 of the second, third and fourth cover members 1b, 1c, 1d have respective thicknesses which vary in inverse proportion to the quantities of the heat storage agents 10 of the corresponding heating elements 6, 7, 8. That is, as the quantity of the heat storage agent 10 increases, the thickness of the upper cushion 3 decreases.

This is because, in order to speed up transmission of heat to the driver's body, a heating element having a greater heat storage capacity requires an upper cushion having a smaller heat retaining ability. Since the heat retaining ability of the upper cushion 3 varies with the thickness, the thicknesses of the upper cushions 3 are set to vary in inverse proportion to the heat storage capacities of the heating elements 6–8 (viz., the quantities of the heat storage agents 10 in the respective heating elements 6–8).

The cord heater 12 of each of the heating elements 6–8 is provided with a temperature switch 14. Opposite ends of each respective cord heater 12 are connected to a plug 17 via connectors 16 and a power cable 15 so that the heating elements 6–8 can be connected to a power supply, such as a cigarette lighter, of the truck via the plug 17.

The heat storage mat of the foregoing construction operates as follows. When the heating elements 6–8 are energized, the respective cord heaters 12 heat the heat storage agents 10 in the corresponding bags 9. With this heating, the heat storage agents 10 are fused or converted from the solid state to the liquid state during which time heat emitted from the cord heaters 12 is absorbed as latent heat by the heat storage agents 10. When the temperature switches 14 are opened, or when the plug 17 is disconnected from the power supply, the heating elements 6–8 are de-energized whereupon the heat storage agents 10 undergo a phase change or transformation from the liquid state to the solid state. During that time, latent heat is continuously evolved from the heat storage agents 10 so that the corresponding cover members 1b–1d of the heat storage mat are heated until the solidification of the heat storage agents 10 completes.

In general, while the truck is running, the cord heaters 12 are connected to the power supply so as to heat the heat storage agents 10 until the heat storage agents 10 are fully converted from the solid state to the liquid state.

When the heat storage agents 10 fully absorb latent heat (namely, when conversion of the solid heat storage agents 10 to the liquid state completes), they raise the temperature rapidly. With this rapid temperature rise, the temperature switches 14 are opened so that the heating elements 6–8 are de-energized. Thus, the heat absorbing operation of the heating elements 6–8 is completed. Obviously, the heating element 8 having a greater quantity of the heat storage agent 10 than the other heating elements 6, 7 requires a longer time for the heat absorbing operation.

When the heat storage mat is to be used, the truck is stopped. The truck driver sleeps on the heat storage mat with the head and shoulders resting on the first bag-like cover member 1a. That is, the chest and the waist of the body are supported on the second bag-like cover member 1b; the hip and thighs of the body are supported on the third bag-like cover member 1c; and the legs of the body are supported on the fourth bag-like cover member 1d (cf., FIG. 3). Excepting the head, the body of the driver is covered with a suitable coverlet such as a blanket.

The chest and the waist evolve a large quantity of heat so that these parts are able to warm up quickly only with the use of the blanket. Accordingly, the second cover member 1b on which the chest and waist are supported requires a heating element (namely, the first heating element 6) having the least quantity of heat storage agent 10. Since these parts of the body which evolve a large quantity of heat can be kept warm even when the heat evolution speed of the heating element 6 is relatively low, the upper cushion 3 of the second bag-like cover member 1b, serving as a heat insulator on the heat evolution side, can preferably be thickened.

For the back of the body, a thick upper cushion 3 of the second bag-like cover member 1b is able to provide a comfortable cushioning effect.

The hip and the thighs supported on the third bag-like cover member 1c evolve a smaller quantity of heat than the chest and the waist, so that the second heating element 7 of the third bag-like cover member 1c requires a greater quantity of the heat storage agent 10 than the first heating element 6. Similarly, the upper cushion 3 of the third bag-like cover member 1c is thinner than that of the second bag-like cover member. Thus, heat evolved from the second heating element 7 is transmitted speedily and efficiently to the hip and the thighs of the body.

The legs of the body are supported on the fourth bag-like cover member 1d including the third heating element 8. The upper cushion 3 of the fourth bag-like cover member 1d is the thinnest so that heat evolved from the heating third element 8 can be transmitted to the legs soon. As previously described, the legs evolve the least quantity of heat. However, the heat storage agent 10 associated with the third heating element 8 is greater in quantity than those of the first and second heating elements 6, 7. Accordingly, this heat storage agent is able to store a greater quantity of heat than the other heat storage agents 10. Thus, heat evolved from the respective heating elements 6–8 is transmitted to the driver's body with uniform distribution over the entire area of the body except the head. With this uniform heat distribution, a comfortable sleep of the driver is possible.

The heat storage mat of the present invention has various advantages, as described below.

The heat storage mat includes a plurality of heating elements having different quantities of heat storage agents. In addition, upper cushions on which the body of the driver is supported have respective thicknesses which are adjusted to have a certain relation to the quantities of the heat storage agents. With this relation, the mat is able to provide a heat intensity, a heat insulation and a cushioning that are optimum for a comfortable sleep.

The quantities of the heat storage agents are inverse proportional to the thicknesses of the upper cushions, so that the bag-like cover members have substantially the same thickness.

Furthermore, the heat storage agents associated with the respective heating elements have the same transformation temperature. The mat can, therefore, be manufactured easily at a low cost as compared to the conventional heat storage mat in which is used a plurality of heat storage agents having different transformation temperatures.

Obviously, various modifications and variations of the present invention are possible in the light of the above teaching. For example, the sodium acetate base heat storage agent may be replaced with polyethylene glycol. In addition, the number of the bag-like cover is not limited to four. It is therefore to be understood that within the scope of the appended claims the invention may be practiced otherwise than as specifically described.

What is claimed is:

1. An elongated heat storage mat for supporting thereon a human body with a head of the human body resting on one end portion of the mat, said heat storage mat comprising:

a plurality of substantially flat heating elements arranged in a row in a longitudinal direction of said mat, each of said heating elements including a flat bag filled with a latent heat storage agent and an electric heater unit disposed on an underside of said flat bag for heating said latent heat storage agent, the quantities of said latent heat storage agents associated with the respective heating elements increasing successively in a direction from said one end portion to an opposite end portion of said mat;

a plurality of heat insulating cushions each disposed on an upper surface of a corresponding one of said bags, said heat insulating cushions have thicknesses which vary in inverse proportion to the quantities of said latent heat storage agents of the respective bags; and a bag-like cover holding therein said heating elements and said heat insulating cushions.

2. An elongated heat storage mat according to claim 1, wherein said latent heat storage agent is sodium acetate.

3. An elongated heat storage mat according to claim 1, wherein said latent heat storage agent is polyethylene glycol.

4. An elongated heat storage mat according to claim 1, wherein each of said heating element further includes an impregnated matrix held in each of flat bags together with said latent heat storage agent.

5. An elongated heat storage mat according to claim 1, further including a plurality of heat insulating cushions each disposed on the underside of a corresponding one of said flat bags with said electric heater unit disposed therebetween.

6. An elongated heat storage mat according to claim 1, wherein said bag-like cover is composed of a row of bag-like cover members connected end to end in the longitudinal direction of said mat, an endmost one of said cover members holding therein a heat insulating cushion assembly, the remaining cover members holding respectively therein said heating elements and said heat insulating cushions, said endmost cover member forming said one end portion of said mat.

7. An elongated heat storage mat according to claim 6, wherein said heating elements comprise first, second and third heating elements, said first heating element is disposed in one of said cover members which is disposed next to said endmost cover member, said latent heat storage agent associated with said second heating element is larger in quantity than one associated with said first heating element by about 50% to about 100%, and said latent heat storage agent associated with said third heating element is larger in quantity than one associated with said second heating element by about 50% to about 100%.

* * * * *